(12) United States Patent
Redgate et al.

(10) Patent No.: US 6,281,784 B1
(45) Date of Patent: Aug. 28, 2001

(54) INFORMATION AND CONTROL COMMUNICATION OVER POWER LINES

(75) Inventors: Robert E. Redgate; Anthony R. Carson, both of Waynoka; Michael T. Collins, Woodward; Kiet Q. Lam, Woodward; Dustin P. Ketron, Woodward; Donald L. Toland, Alva, all of OK (US)

(73) Assignee: RedGate Industries, Inc., Waynoka, OK (US)

( * ) Notice: Subject to any disclaimer, the term of this patent is extended or adjusted under 35 U.S.C. 154(b) by 0 days.

(21) Appl. No.: 09/258,566

(22) Filed: Feb. 26, 1999

(51) Int. Cl.[7] .................................................. H04B 3/00
(52) U.S. Cl. ............................. 340/310.01; 340/310.02; 340/310.06; 375/259
(58) Field of Search ........................ 340/310.01, 310.02, 340/310.06; 375/259

(56) References Cited

U.S. PATENT DOCUMENTS

| | | | |
|---|---|---|---|
| 4,200,862 | 4/1980 | Campbell et al. | 340/310.01 |
| 4,418,333 | 11/1983 | Schwarzbach et al. | 340/310.01 |
| 4,429,299 | * 1/1984 | Kabat et al. | 340/310.01 |
| 4,628,440 | 12/1986 | Thompson | 700/19 |
| 4,638,299 | 1/1987 | Campbell | 340/310.04 |
| 4,703,306 | 10/1987 | Barritt | 340/310.08 |
| 5,352,957 | * 10/1994 | Werner | 315/291 |
| 5,471,114 | 11/1995 | Edwards et al. | 315/86 |
| 5,491,463 | 2/1996 | Sargeant et al. | 340/310.01 |
| 5,734,230 | 3/1998 | Edwards et al. | 315/86 |
| 5,838,226 | * 11/1998 | Houggy et al. | 340/310.01 |
| 5,877,957 | * 3/1999 | Bennett | 340/286.01 |

OTHER PUBLICATIONS

Publication entitled "Technical Note—The X–10 Powerhouse Power Line Interface Model # PL513 and Two–Way Power Line Interface Model · TW523, " Home Automation System, Inc., 14 pages , Feb. 01, 1998.

* cited by examiner

*Primary Examiner*—Donnie L. Crosland
(74) *Attorney, Agent, or Firm*—McAfee & Taft (57) ABSTRACT

Power line installation wires which carry electricity to energize devices connected to the wires can also be used simultaneously to carry other electrical signals that convey information or control between devices connected to the wires. With regard to the disclosed power line communication system and method and related components and processes, each device to be connected to an electric power line installation can be uniquely identified (referred to as the device's electronic genetics) in such a manner that practical applications are not limited as to the number of devices connected to, or as to complexity of information or control effected by communications over, the wires of the power line installation. With its unique identity, any such device can be connected to any power line installation to communicate with any other such device connected to that installation so long as the identity information and linked operational files are within the system of devices connected to the particular installation.

4 Claims, 5 Drawing Sheets

PRIOR ART

INFORMATION AND CONTROL COMMUNICATION OVER POWER LINES

BACKGROUND OF THE INVENTION

This invention relates generally to power line communication systems and methods and components for use in, and aspects of, such systems and methods. One such aspect includes electronic genetics, the name given to the present invention's concept of uniquely identifying every device that can be connected to a power line installation both for energization and for information and control communication over the wires of the installation; with its unique identity, any such device can be connected to any power line installation to communicate with any other such device connected to that installation so long as the identity information is within the system of devices connected to the particular installation.

The wires of a power line installation which carry electricity to energize devices connected to the wires can also be used simultaneously to carry other electrical signals that convey information or control between devices connected to the wires. See, for example, U.S. Pat. No. 4,200,862 to Campbell et al.; U.S. Pat. No. 4,628,440 to Thompson; U.S. Pat. No. 4,638,299 to Campbell; and U.S. Pat. No. 5,491,463 to Sargeant et al. These patents refer to a power line communication protocol known as "X-10" and an extension of that protocol.

Under X-10 protocol as described in the aforementioned patents, a thirteen-bit code is transmitted from one device (e.g., a lamp) connected to a particular power line installation (e.g., in a home) to another device (e.g., a computer) also connected to the same installation. In one disclosed technique, each bit after four predetermined start bits is transmitted in true and complement form at the zero crossings of consecutive half cycles of an alternating current power signal also carried on the wires of the power line installation. These bits are transmitted using an alternating current signal having a frequency much higher than the frequency of the power signal. Using this technique the first device can advise the second device that it is on or off, for example. As another example, the first device can send a code to control the second device to turn on or turn off.

Although the X-10 protocol has advantages, such as in its encoding and transmission techniques, a significant shortcoming is its inability to accommodate either large numbers of devices connected to a power line installation or sophisticated information or control transactions. Even the extended code version described in the aforementioned Sargeant et al. patent is limited. Furthermore, devices are identified only within the context of the particular system in which they are connected; the devices do not have unique identities that are universal in scope (i.e., that they are always identified by no matter to what particular power line installation they are connected). As a result, these previously disclosed power line communication techniques have not been widely adopted for use in commercial or industrial installations or where complex information and control are needed.

SUMMARY OF THE INVENTION

The present invention overcomes the above-noted and other shortcomings of the prior art by providing a novel and improved power line communication system and method and related components and processes. In the present invention, each device to be connected to an electric power line installation can be uniquely identified (sometimes referred to herein as the device's electronic genetics) in such a manner that practical applications of the invention are not limited as to the number of devices connected to, or as to complexity of information or control effected by communications over, the wires of the power line installation.

Regarding the complexity of information or control that can be effected using the present invention, non-limiting examples include hand-shaking between devices, running diagnostics, registering product warranties, mapping the layout of where and what devices are connected within the power line installation, self- or automatic identifying such as when a new device is connected to the installation, and providing security and total control of the electronic environment. Limitations may be imposed based on the complexity one wants to use in a particular system, and even then it can be expanded if accessible memory is available or if other add-on capability is provided for.

Another advantage of the present invention is its reliability. The present invention uses multiple code patterns or segments to uniquely identify a specific device, and such multiple segments provide significant reliability in that the chances of an out of order sequence or improper activation are reduced since recognition and response requires identity of each bit in the overall group of multiple segments. Furthermore, in a particular implementation, handshaking occurs to verify to one device that another device has received the specific required bit patterns and taken a desired action. For example, a transmitting device might in effect continue to inquire of a receiving device, "Did you get the information?," until the receiver responds, "Yes, I did. What do you want me to do next?." This can prevent out of order sequence data packets or keys.

The present invention provides an improvement for a power line communication system having at least two devices connected to a respective one of a plurality of power line installations capable of providing electricity to the at least two devices. The improvement comprises a transmitter for one of the devices and a receiver for another of the devices. The transmitter is encoded with a universal identification code uniquely and universally identifying the transmitter's respective device regardless of the respective power line installation to which the transmitter's respective device is connected. The receiver is adapted to receive an electrical signal representing the universal identification code and transmitted from the transmitter over the respective power line installation to which the transmitter's respective device and the receiver's respective device are connected, and the receiver includes a library in which to store recognition data corresponding to the transmitter's universal identification code. The library can include at least a program file responsive to the receiver receiving the electrical signal representing the universal identification code. The improvement can further comprise a portable memory device programmed with the recognition data corresponding to the transmitter's universal identification code. The receiver in this case is adapted to receive the recognition data from the portable memory device.

The present invention further provides a method for a power line communication system of the type described above. This method comprises transmitting from one of the devices onto the respective power line installation an electrical signal representing a universal identification code uniquely and universally identifying the transmitting device regardless of which of the plurality of power line installations is the respective one to which the transmitting device is connected. This method further comprises receiving over the respective power line installation at another of the devices the electrical signal representing the universal identification code. The method also includes processing at the receiving device the received electrical signal to determine if the represented universal identification code corresponds to recognition data stored in the receiving device.

The present invention further provides a power line communication method comprising: communicating a house code and a unit code over a common power line installation from a first device to a second device, wherein the house code and the unit code are in a format of a predetermined power line communication protocol (e.g., X-10); and reinterpreting in the second device the communicated house code and unit code such that in response thereto the second device accesses a program file or data file programmed in the second device.

Another definition of a power line communication method of the present invention includes: communicating a universal identification code over a common power line installation from a first device to a second device, wherein the universal identification code is unique to the first device; subsequently communicating additional codes over the common power line installation from the first device to the second device, wherein at least some of the additional codes are not unique to the first device; and interpreting in the second device the additional codes in response to the universal identification code such that the additional codes cause the second device to perform functions with regard to the first device even though the additional codes themselves are not unique to the first device.

The present invention further provides an electronic genetic transmitter that comprises: an interface circuit programmed to communicate over a power line installation, the interface circuit including means for transmitting electrical signals from the interface circuit; and a programmable circuit connected to the interface circuit and adapted to receive programming to define in the electronic genetic transmitter a universal identification code unique to a specific device in which the electronic genetic transmitter is to be installed. In one implementation the programmable circuit is also adapted to be programmed with a location code defining a specific location at which the specific device is operational such that the specific device is not operational at another location.

In another adaptation of the present invention, an electronic genetic transceiver comprises the aforementioned elements of the electronic genetic transmitter as well as receiver means for receiving electrical signals into the interface circuit.

The present invention further provides a power line communication integrated circuit device. This device comprises a back end circuit adapted to be programmed with a universal identification code for a specific product to which the power line communication integrated circuit device is to be connected; and a front end circuit connected to the back end circuit and programmed to communicate electric signals out of the integrated circuit device, the electric signals encoded to convey information, including the universal identification code when programmed in the back end circuit, to another device connected to the power line installation when the power line communication integrated circuit is connected to the power line installation. In one implementation the front end circuit further includes: a memory programmed with a library containing program files corresponding to a plurality of universal identification codes; and means for executing a respective program file in response to the front end circuit receiving an electrical signal representing the universal identification code corresponding to the respective program file. In a particular implementation the back end circuit is also adapted to be programmed with a location code defining a specific location at which the specific product is operational such that the specific product is not operational at another location.

The present invention further provides an electric device comprising: an electrically energizable apparatus that performs the intended function of the electric device; a front end circuit programmed to communicate electric signals, the electric signals encoded to convey information distinct from a power signal conducted over the power line; a back end circuit connected to the front end circuit and adapted to be programmed with a universal identification code for the electric device; and means for connecting the apparatus, the front end circuit and the back end circuit to a power line. In a particular implementation the universal identification code identifies make, model and serial number information of the electric device.

Another definition of an electric device of the present invention includes an electrically energizable apparatus that performs the intended function of the electric device; means for connecting the apparatus to an alternating current power line installation; means for sensing a condition of the apparatus and for generating a respective control signal in response to a sensed condition; and means for generating a respective alternating current electrical signal in response to the respective control signal, the respective alternating current electrical signal defining a code to be propagated over the power line installation. In this context the present invention more specifically provides a monitoring device for an electric lamp that connects to an alternating current power line. This monitoring device comprises a current sensing circuit to sense electric current relative to operation of the electric lamp; a comparison circuit connected to the current sensing circuit to compare a sensed current measurement to a predetermined reference magnitude; and a microcontroller connected to the comparison circuit and programmed to output for transmission over the power line respective codes corresponding to respective outputs from the comparison circuit. In a particular implementation each respective code includes at least one four-bit binary code transmitted in a format of X-10 protocol.

Specifically with regard to an electric lamp system including a ballast, a first electric lamp, and a second electric lamp connected together and energized over an alternating current power line installation, the monitoring device of the present invention comprises a current sensing circuit to sense electric current at a power input of the ballast; a first comparator connected to the current sensing circuit to compare the sensed current to a first reference; a second comparator connected to the current sensing circuit to compare the sensed current to a second reference; and a microcontroller connected to the first and second comparators and programmed to output for transmission over the power line respective codes corresponding to respective outputs from the first and second comparators, wherein the respective codes include a first code output in response to the first and second comparators indicating the first and second lamps are conducting operating current, a second code output in response to the first and second comparators indicating one of the first and second lamps is conducting operating current and the other of the first and second lamps is not conducting operating current, and a third code output in response to the first and second comparators indicating neither of the first and second lamps is conducting operating current. In a particular implementation the microcontroller is further programmed to output for transmission over the power line a fourth code identifying the ballast with which the monitoring device is used.

The present invention further provides a method of monitoring and reporting a condition of an electrical device connected to an alternating current power line installation. This method comprises sensing alternating current flow related to the condition of the electrical device; transmitting a first code over the power line installation in response to a first condition being sensed; and transmitting a second code over the power line installation in response to a second condition being sensed. The method can further comprise receiving over the power line installation the transmitted first or second code and executing in a computer a program file in response to the received code. The method also can further comprise transmitting over the power line installation a third code identifying the electrical device.

In a power line communication system comprising at least one transmitter and at least one receiver electrically connected to a power line transmitting an alternating current power line signal of known frequency and having zero crossings, the present invention still further provides the improvement comprising an identification code including a plurality of data signals for transmission and reception by a transmitter and receiver of the power line communication system wherein each data signal comprises a plurality of data bits transmitted over the power line at a frequency greater than the frequency of the power line signal with the data signal's data bits transmitted at respective zero crossings of the power line signal, the data bits of each data signal disposed in an X-10 protocol format wherein there is a house code and a unit code but wherein the unit code does not have a fifth bit.

The present invention further provides an article of manufacture comprising: means for defining in the article a unique identification code; and means for electrically propagating from the article a plurality of data signals collectively representing the unique identification code, wherein each of the data signals has a plurality of data bits transmitted in the form of an X-10 house code and an X-10 unit code except the unit code does not include a fifth bit.

The present invention further provides a method of identifying objects connected to an alternating current power line installation, comprising electrically propagating, at least once from each object, a respective plurality of data signals collectively representing a respective unique identification code for each object, wherein each of the data signals has a plurality of data bits transmitted in the form of an X-10 house code and an X-10 unit code except the unit code does not include a fifth bit. In a particular implementation the data signals within each plurality of data signals collectively representing a respective unique identification code are transmitted in a continuous sequence and/or within a predetermined length of time.

The present invention also provides a method of rapidly performing complex tasks in a computer-operated device, comprising: communicating an actuation signal from a first microcontroller to a second microcontroller, including transmitting from the first microcontroller to the second microcontroller a multiple segment digital signal wherein each segment includes a predetermined house code and unit code; and executing substantially simultaneously with the transmitting of the digital signal, a program file stored in the second microcontroller in response to the second microcontroller receiving and recognizing the actuation signal, wherein the program file contains programming instructions which are substantially longer than the multiple segment digital signal.

Therefore, from the foregoing, it is a general object of the present invention to provide a novel and improved power line communication system and method and related components and processes. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 6 is a block diagram for illustrating another type of responsiveness within the present invention to codes received in power line communications.

FIG. 7 is a block diagram for illustrating one embodiment of device for use within the power line communication system of the present invention.

FIG. 11 is a schematic and block diagram of an intelligent ballast control device of the present invention.

DETAILED DESCRIPTION OF THE INVENTION

U.S. Pat. No. 4,200,862 to Campbell et al.; U.S. Pat. No. 4,628,440 to Thompson; U.S. Pat. No. 4,638,299 to Campbell; and U.S. Pat. No. 5,491,463 to Sargeant et al. are incorporated herein by reference. Also incorporated herein by reference are U.S. Pat. No. 4,418,333 to Schwarzbach et al. and U.S. Pat. No. 4,703,306 to Barritt.

Figure 1:
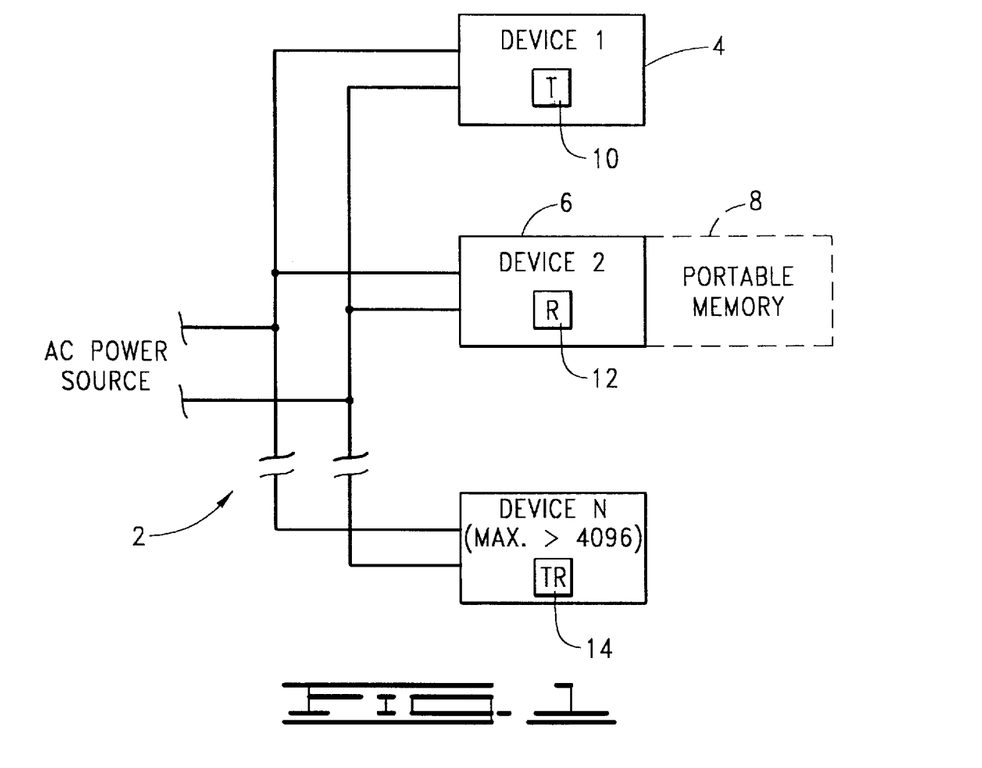
FIG. 1 is a block diagram for illustrating a power line communication system of the present invention.

Referring to FIG. 1, a power line installation 2 is illustrated. This is just one of any number of power line installations with which the present invention can be used. The power line installation 2 is shown as including at least two wires connected to an alternating current power source, such as provided by a public or private electric mains facility (e.g., a public electric utility company) to a residential, commercial or industrial location. The alternating current power source might typically be a three-phase system providing a 60-hertz or 50-hertz electric current at 120 or 240 volts(ac).

Although the power line installation with which the present invention is typically used is an alternating current system, it is contemplated that aspects of the present invention can be used in a direct current system as the power signal merely needs to be accommodated in the concurrent use of the conductive wire by the communication of the present invention. That is, the present invention can merely share the wires with the energizing electricity, whether it be direct current or alternating current; however, particular implementations and preferred embodiments of the present invention described below do function with the alternating current power signal in synchronizing transmissions with zero crossings of that power signal. The present invention will, therefore, be described in the context of an alternating current power line installation.

At least two devices in accordance with the present invention are connected to the power line installation 2 such that energizing electricity is provided to the devices. FIG. 1 illustrates that more than 4,096 devices can be connected if the particular power line installation can support the resulting electrical load. Fewer devices can, of course, also be used in a system of the present invention. Since the least number of devices is two, the remainder of the invention will be described with regard to two such devices marked with the reference numerals 4 and 6 in FIG. 1.

The devices connected to the power line installation 2 for use in accordance with the present invention can be of any type that permits of the electrical communication described below with regard to the present invention. This includes devices that use electricity to operate or to be controlled. It is thus contemplated that these include, but are not limited to, every type of electric device used in residential, commercial and industrial environments. It is also contemplated that aspects of the present invention can be used with other communication systems such as in real-time control systems that require fast communication but complex control (e.g., automated prosthetics or other computer-operated device in accordance with the present invention in which one microcontroller communicates rapidly in relatively short digital control signals with another microcontroller having a substantially longer, more complex program to perform substantially simultaneously with the transmission and reception of one or more of the control signals).

FIG. 1 also illustrates that any of the devices can have a separable portable memory 8 that can be removed from its physical association with its respective device and used by another device (in or out of the particular system) to read or download contents of the memory device 8. An example of the memory 8 includes a conventional memory diskette but programmed or containing contents in accordance with the present invention. The purpose of the memory device 8 in the present invention is described below.

In the simplest system of the present invention, the device 4 sends something unique to the device 6. This "something" can be referred to as a "key." When this key "fits" (i.e., is recognized) in the device 6, it "unlocks" files that enable operation of whatever type are designed. These operations can be from the very simple to the very complex. For example, if the device 6 is a computer, when the computer receives a "key" that it can identify, the computer "unlocks" larger, useful files of information previously stored in the computer. Such files can include program code to perform specific operations (e.g., display graphics; recreate a collection of information or images from separate data stored in the computer). Another task can be to move to different levels of a hierarchy of tasks or operations as a result of entering a first level of the hierarchy in response to the "unlocking." Still further, mathematical analyses can be performed to extrapolate and thereby construct functional files or operations. Other functions or collections of data or information can be accessed through the "unlocking" aspect of the present invention. These are just examples and do not limit what can be done in response to receiving and recognizing such a key.

Thus, in view of the foregoing brief explanation, at least one of the devices connected to the power line installation 2 has a transmitter and at least another of the devices has a receiver so at least one one-way communication can occur. This is illustrated in FIG. 1 by the device 4 including a transmitter 10 and the device 6 including a receiver 12. Preferably, however, every device implemented within the scope of the present invention will have both a transmitter and a receiver, thereby permitting two-way transceiver capability as indicated at transceiver (including separate transmitter and receiver configurations) 14 shown in FIG. 1.

In a transmitter portion of a device of the present invention, the transmitter is encoded with a universal identification code uniquely and universally identifying the transmitter's respective device regardless of the respective power line installation to which the transmitter's respective device is connected. Such a transmitter transmits from its respective device onto the respective power line installation an electrical signal representing the universal identification code uniquely and universally identifying the transmitting device regardless of which of the possible power line installations is the respective one to which the transmitting device is connected. The term "electrical signal" as used in this context does not need to be a continuous transmission but can be defined with a collection of discrete transmissions. In a particular implementation as described further below, for example, the electrical signal can include a plurality of sequences of alternating current transmissions using a frequency greater than the frequency of the alternating current power signal conducted over the respective power line installation. In such particular implementation, each sequence of transmissions occurs over a series of zero crossings of the power signal.

The receiver portion of a device of the present invention is adapted to receive the electrical signal representing the universal identification code transmitted from the transmitter of another device over the respective power line installation to which the two devices are connected. When such an electrical signal is received, the receiving device processes it to determine if the represented universal identification code corresponds to recognition data stored in the receiving device. To accomplish this in at least a particular implementation of the present invention, the receiver includes a library in which to store recognition data corresponding to universal identification codes that might be received. Such a "library" is marked in FIG. 2 by the reference numeral 16 and is illustrated as including recognition data 18 and contents to which the recognized codes link (marked with the reference numeral 20). This library is typically contained in the digital memory of the receiver, or more generally the receiving device as a whole; however, the library can be defined in a distributed manner as well (either by multiple collections throughout multiple memory devices in the receiver or by multiple collections in or out of the receiver itself).

Further description will next be given with regard to the "universal identification code," "recognition data 18" and "contents to which the codes link 20."

The universal identification code can be derived from some intrinsic distinctive operating characteristic of the device to which the code is assigned. An example of such an intrinsic characteristic can be determined by monitoring an operating current or voltage of the device and determining a unique repeated pattern. If such a unique repeating pattern exists, the device in essence has a natural "electronic genetic code." Such an intrinsic characteristic could be defined as that device's "DNA."

Due to the likely difficulty in establishing such a unique intrinsic characteristic, it is presently preferable to assign a unique identity. A non-limiting example of such an assigned identity is to specify a particular device by its type, make, model and serial number (e.g., television, General Electric, 25-inch color, x . . . x). Such an assigned identity becomes at least part of the useful "electronic genetic code" for that device. Individual components of such electronic genetic code may not be unique, but collectively they are.

In creating such an assigned electronic genetic code, there is the need for a protocol by which the code can be defined in the first instance and recognized by other devices in the system. Such a protocol in essence defines what combinations of "0's" and "1's" in a digital domain uniquely identify an object and are recognized as such. Such a protocol can be of any type suitable for communication between devices connected to a power line installation. For example, the protocol can define a code within a specific number of bits wherein the entire collection of bits for any one device is unique. Within the overall collection, one or more bits in a group can be used to define different characteristics or aspects of the device, such as the type of device, its make, its model and its serial number as referred to above. The make, model and serial number information is typically assigned by the manufacturer of a device and the type of product can be defined in accordance with a selected standard (e.g., the 1997 North American Industrial Classification System (NAICS) code or the 1987 Standard Industrial Classification (SIC) code).

As another example, a protocol can allow a variable number of bits to be used but having a maximum number defined or requiring that all of the bits must be received within some predetermined or selected time period. This can also be made variable if an initial definition or a first communication is provided for during which the number of following bits or duration to thereafter monitor for is defined.

It is also noted that encoding schemes other than binary digital encoding can be used. It is contemplated that analog voltages or variable frequency signals or other types of encoding can be used within certain aspects of the present invention. The present invention will be further described, however, with regard to the presently preferred binary digital encoding. One such particular implementation is based on devices using a twelve-bit algorithmic core. This type of electronic process functions on similarity mapping between transmitted and received information and the recognition data or algorithm of the receiving device.

The preferred embodiment of the present invention uniquely defines the universal identification code portion of the electronic genetic code, and yet such definition advantageously uses aspects of a pre-existing encoding structure. The specific pre-existing encoding structure of a particular implementation of the present invention is selected from the group consisting of X-10 protocol and extensions of that protocol. Specific reference is made to the first four patents referred to above and incorporated herein by reference. Other formats or codings can be used; however, the further description of the present invention will be made with regard to the X-10 protocol. What is meant by this use of a pre-existing protocol is that internal groupings of bits are sequentially consistent with these other protocols, the specific bit patterns defining information within the groupings are also the same, and the bit transmission technique is the same; however, the overall code structure of the present invention and how the present invention uses the resulting structure are distinctive. Further explanation will be given with regard to FIGS. 3 and 4.

Figure 3:
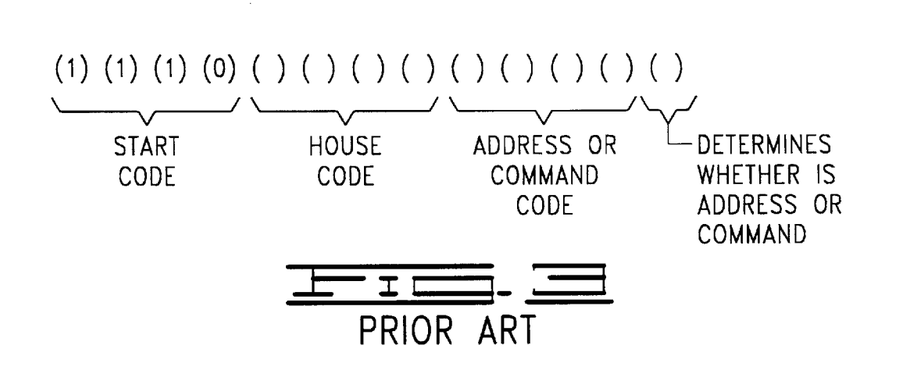
FIG. 3 illustrates the encoding structure for a prior art power line communication protocol referred to as X-10 protocol.

FIG. 3 illustrates the prior art X-10 code structure described in the aforementioned four patents. It includes a four-bit predetermined start code ("1110") followed by a four-bit house code and a five-bit operation code that can be either an address or a command code defined by the first four bits with the "address" or "command" function being defined by the fifth bit as indicated in FIG. 3. Each possible house code is identified by a respective letter "A" through "P" and each possible address or command code is identified by a respective decimal number "1" through "16" (the actual four-bit binary code need not be, and is not in a particular implementation, the numerical binary equivalent of the corresponding decimal number or alphabetical sequence).

Figure 4:
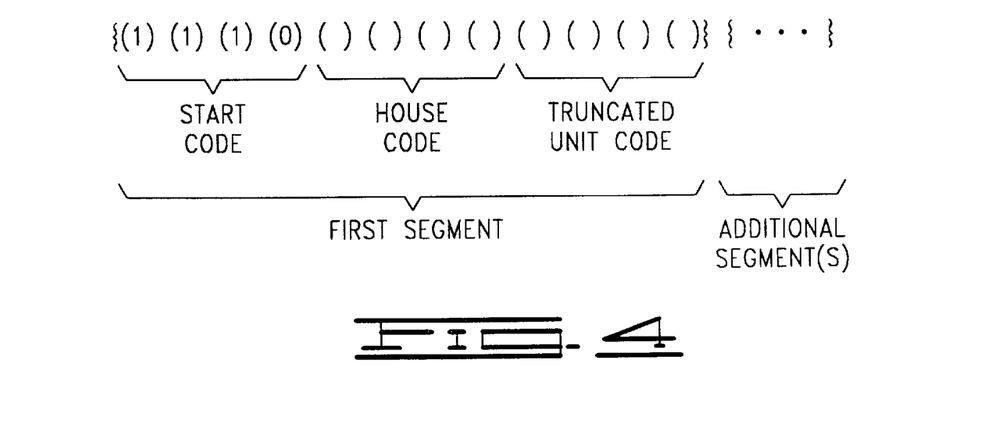
FIG. 4 illustrates the encoding structure for a particular implementation of power line communication protocol in accordance with the present invention.

The structure of the universal identification code of the present invention is represented in FIG. 4. The identification code of the present invention comprises multiple segments with each segment constructed in a manner similar, but not identical, to the X-10 protocol. As illustrated in FIG. 4, the first segment can begin with the same start code followed by a four-bit house code which in turn is followed by a truncated four-bit unit code (i.e., the first segment of the present code does not include the last bit used in the X-10 protocol code shown in FIG. 3). Thus, the basic X-10 protocol encoding uses thirteen bits whereas the present invention's basic code includes several more bits than that but arranged in segments of twelve bits in length for each segment. In a particular implementation of the present invention, the four-bit encodings for the house code and the truncated unit code use the same bit patterns as used in the "A" through "P" and "1" through "16" four-bit bit patterns used in the X-10 protocol. However, the present invention encompasses other types of specific bit codings as well. Each of the four-bit binary groupings referred to in FIG. 4 can be referred to as "nibbles" as used in the art for distinguishing from an eight-bit "byte" or a sixteen-bit "word." Thus, the universal identification code of the present invention, in the described particular implementation, is defined by a plurality of code segments, each code segment having a maximum number of bits different from the predetermined communication protocol but including nibbles in the same order and having the same possible encoding patterns.

Another use of the predetermined communication protocol is in the manner in which the individual bits are converted into the overall electrical signal transmitted onto and over the wires of the power line installation. In the particular implementation, this is done using the same bit transmission technique as in the predetermined X-10 protocol. In the X-10 protocol, the signal transmission must occur within five hundredths of a second of the zero crossing for a sixty-hertz power signal. This is achieved by transmitting individual bits using a predetermined high frequency signal such as 120 kilohertz. Thus, the electrical communication signal of the present invention includes a plurality of sequences of alternating current transmissions having a frequency greater than the frequency of the alternating current power signal conducted over the respective power line installation. In the X-10 protocol format, each sequence of transmissions occurs over a series of zero crossings of the power signal. For the format of FIG. 4, each segment is transmitted in a series of zero crossings encompassing less than twenty-one zero crossings of the power signal. In another format, such as the extended X-10 code format of the aforementioned U.S. Pat. No. 5,491,463 to Sargeant et al., each series of zero crossings includes less than forty zero crossings per segment of the code of the present invention. Thus, in this particular implementation, each sequence of transmissions (i.e., each twelve-bit segment) within the overall code is transmitted within (i.e., not more than) the transmission time for one complete code structure of the predetermined communication protocol. Thus, in the particular implementation, the present invention provides the improvement comprising an identification code including a plurality of data signals for transmission and reception by a transmitter and receiver of a power line communication system wherein each data signal comprises data bits transmitted over the power line at a frequency greater than the frequency of the power line signal with the data signal's data bits transmitted at respective zero crossings of the power line signal, and the data bits of each data signal are disposed generally in an X-10 protocol format wherein there is a house code and a unit code but wherein the unit code does not have a fifth bit. Of course, the foregoing does not preclude the overall electric signal or an individual data bit being represented by the absence of such high frequency (e.g., a logic "0" might be represented by the absence of a 120-kilohertz waveform and a logic "1" might be represented by the presence of such a waveform in conjunction with a zero crossing of the lower frequency power signal).

Figure 2:
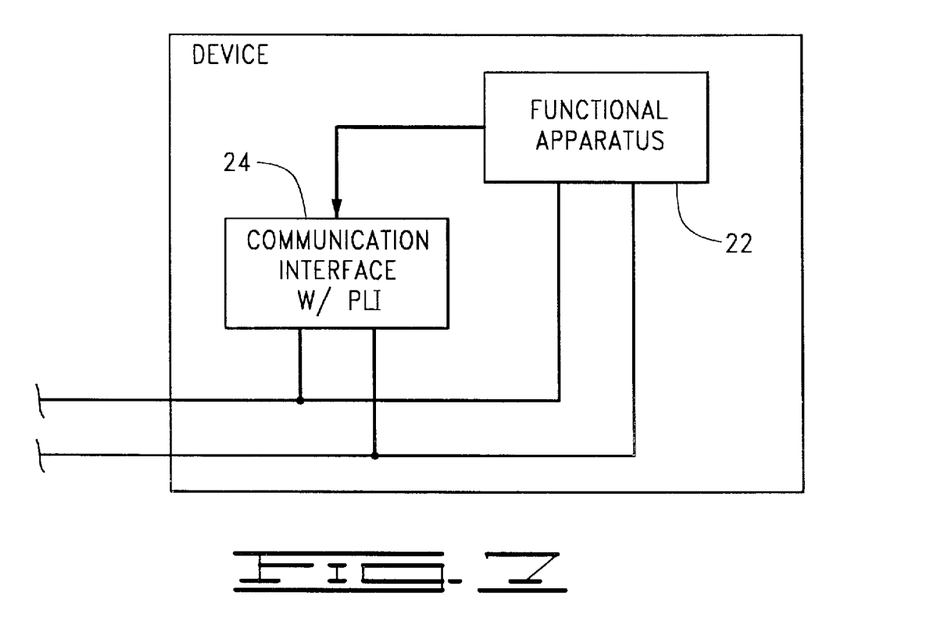
FIG. 2 is a block diagram for illustrating contents of a digital library for at least one type of device of the power line communication system.

In addition to defining the new protocol as described above, the power line communication of the present invention also reinterprets in the receiving device the communicated house code and unit code, which might alone otherwise resemble a pre-existing protocol as described above, such that in response to the communicated house codes and unit codes of all the segments of the universal identification code the receiving device accesses a program file or data file programmed in the receiving device. This occurs via operation of the recognition data 18 and the contents 20 of the libraries of the receiving device such as illustrated in FIG. 2.

The recognition data 18 is the database of all the unique identification codes or other programming by which to recognize valid codes received in the receiving device. This database can be programmed in the receiving device such as when the device is manufactured. There is, however, the need to update such initial database, and that can be provided for by the portable memory 8 that can accompany each individual device. Each portable memory device 8 is programmed with the recognition data corresponding to the respective transmitter's universal identification code. The portable memory 8 can also include additional "content material" to be added to the contents 20 of the receiver's library 16. What is stored on the portable memory 8 can be downloaded to the library 16 of the receiver. Without limitation, such other contents can include time and date of manufacture information, diagnostic applications, etc. Broader aspects of the present invention, however, include other means for enabling a receiver to recognize valid universal identification codes (e.g., an updatable master library accessible by all receivers on the system).

The foregoing enables the present invention to be used in a "plug and play" manner in that receivers already connected to a power line installation can be immediately updated at the same time a new transmitter device is connected into the system.

Once a received code is recognized, the receiver accesses the appropriate contents 20 linked to the recognized code. The contents 20 of the preferred embodiments include at least a respective program file that responds to the receiver receiving the electrical signal representing the respective universal identification code for a particular device connected to the power line installation. Such program file defines at least one function for the receiving device to perform, which at least one function is different from a function of previous predetermined power line communication protocols (e.g., the aforementioned X-10 protocol and extensions thereof) associated with the communicated house code and unit code. These program files can be of any suitable type. In general, they contain a collection of instructions that tell the receiving device what to do. They are typically files containing programs that can be run within the receiving device (e.g., .exe or .com or .bat files). The contents 20 can also include other files of information which might simply update what is being used within a then executing program from another file. In general, the contents are whatever the user chooses to define as the responsiveness of the receiving device to the particular universal identification code.

Figure 5:
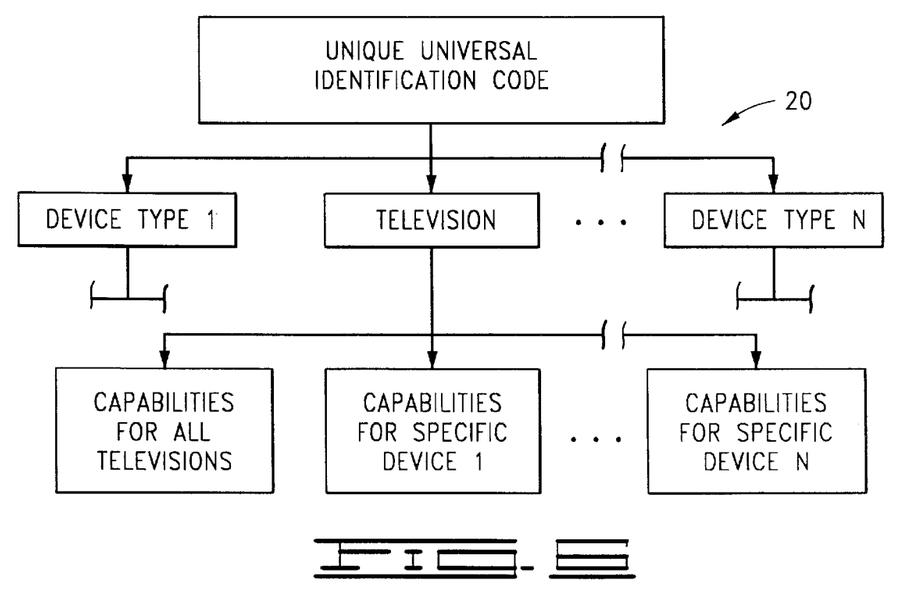
FIG. 5 is a block diagram for illustrating one type of responsiveness within the present invention to codes received in power line communications.

The above description has been directed to the transmission and reception of at least the initial universal identification code that uniquely identifies a particular device. The foregoing also describes how, upon receiving and recognizing such code, the receiving device can perform whatever function it is programmed to perform in response to recognizing the universal identification code. FIGS. 5 and 6 illustrate two particular ways in which this response can occur, and FIG. 5 also shows how additional codes can be received and used in one particular implementation.

Referring to the FIG. 5 implementation, when the unique universal identification code is identified for one specific device, the receiving device goes into its contents 20 and performs one or more functions throughout multiple layers of possible responses for which the receiving device is programmed. These responses are shown constructed in a hierarchy of layers. In one particular application, the recognition of the unique universal identification code enables the receiving device to enter "layer 1" and begin executing a particular executable file. This executable file may in turn utilize information from, or run additional programs in, additional layers. This interaction among layers can be defined to occur in both directions or across layers as illustrated in FIG. 5. Initial entry might even occur at a level other than "layer 1."

Furthermore, FIG. 5 indicates that subsequent codes from the same device can in essence be filtered through the recognition of the initial unique universal identification code to thereafter perform additional functions from the contents 20 of the library 16 of the particular receiving device. The subsequent codes from the same device may not individually be unique, but they are recognized as calling for the performance of particular functions via their linkage to the originally recognized universal identification code that is unique to the one specific device. Thus, the subsequent codes from the same device can be viewed as portions of the overall electronic genetic code of the particular transmitting device, which portions need not be unique except within the overall electronic genetic code that is unique to the specific device. Thus, the present invention as represented in FIG. 5 also includes subsequently communicating additional codes over the power line installation from the transmitting device to the receiving device, wherein at least some of these additional codes are not necessarily unique to the transmitting device, but wherein the present invention further includes interpreting in the receiving device the additional codes in response to the universal identification code such that the additional codes cause the receiving device to perform functions with regard to the specific transmitting device even though the additional codes themselves are not unique to the transmitting device. Thus, although the additional codes are not necessarily unique, the combination of the universal identification code and the additional codes defines a unique electronic genetic profile for the transmitting device.

It is noted that the responsiveness of a receiving device can be linked to share common files or functions. For example, although each particular code is preferably individually identified, the linkage between recognition 18 and contents 20 can be such that different recognized codes can link to the same portion of contents 20 if the same result from contents 20 is desired. A particular example of this is illustrated in the next paragraph.

Referring to FIG. 6, another implementation is illustrated. In this implementation, the unique universal identification code is first recognized and at least a portion of it interpreted as to the type of device. The contents 20 of the library of such a receiving device then performs functions which might be universal to all specific devices of the particular type (e.g., all televisions as illustrated in FIG. 6) as well as in performing the specific capabilities within the contents 20 for the specific device identified by the entire universal identification code received for the particular device. To enable such an interpretation to be made, an individual bit, house code or unit code, or a combination of more than one of these within the segments of the universal identification code, can be assigned to designate the information (i.e., the device type in this case). Alternatively, the entire universal identification code can be meaningless in and of itself other than as containing a bit pattern unique to the specific device, but the receiver contains in its contents 20 the requisite information that is accessed when the respective unique bit pattern is received.

Thus, the present invention can be used, for example, to store large files of information or programs that are used in response to relatively small "keys" defined by the unique universal identification codes and any subsequent codes of the respective electronic genetic profile. This enables relatively short and rapid communications to occur between devices, while also enabling the receiving device to then perform tasks from the very simple to the very complex in response to a recognized relatively simple communication. Accordingly, the present invention of the particular implementation described above defines an electronic genetic profile for a first device adapted to be connected to an alternating current power line. It also includes encoding the first device with the defined electronic genetic profile. A second device that is adapted to be connected to the alternating current power line is programmed such that the second device recognizes at least portions of the electronic genetic profile communicated to the second device from the first device over the alternating current power line when the first device and the second device are connected to the power line. The second device is also programmed with responsive data such that the second device uses at least part of the responsive data when the first and second devices are connected to the power line and at least a recognizable part of the electronic genetic code of the first device is communicated to the second device over the power line. As explained above, the electronic genetic profile includes at least a universal identification code unique to the first device, but it can also include additional codes which need not be unique to the first device. These features can be in both devices (or any or all of more devices) to enable two-way information and control communication over interconnecting power lines.

Figure 8:
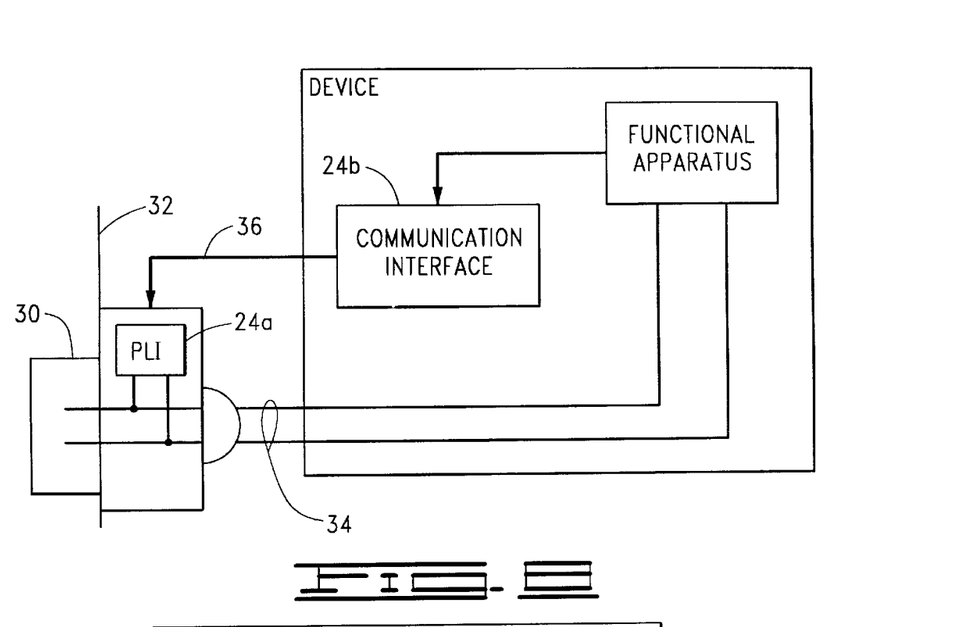
FIG. 8 is a block diagram for illustrating another embodiment of device for use within the power line communication system of the present invention.

Referring to FIGS. 7 and 8, examples of electric devices for use as devices 4, 6, etc., in the present invention will be described. In FIG. 7, the electric device includes a functional apparatus 22 which is electrically energizable and which performs the intended function of the electric device. For example, if the device is a lamp, the functional apparatus 22 includes at least the socket and switch of the lamp. If the device is a computer, the functional apparatus 22 includes the conventional components of the computer.

The device illustrated in FIG. 7 also includes a communication interface combined with a power line interface collectively identified by the reference numeral 24. The communication interface portion includes the transmitter and/or receiver portions represented in FIG. 1. The communication interface is a programmable circuit adapted to receive programming to define in the device, or within the communication interface portion itself (which is inventive in and of itself such as constituting an electronic genetic transmitter or transceiver), a universal identification code unique to the specific device in which the particular communication interface is installed or is to be installed.

Figure 9:
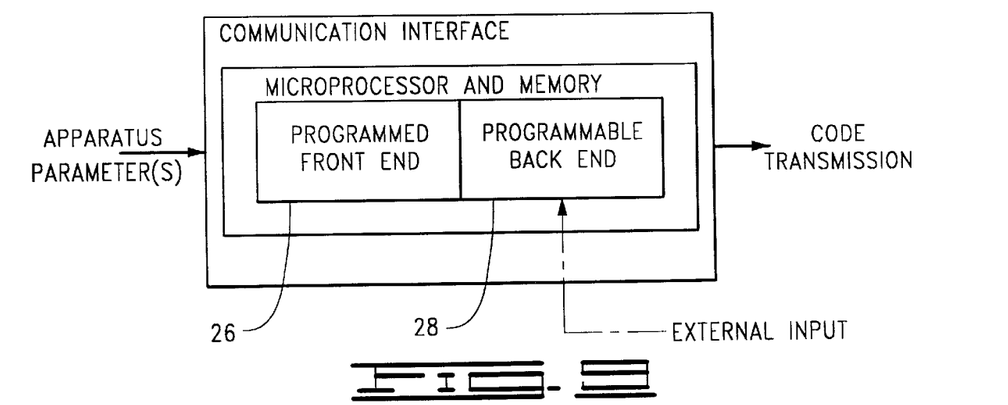
FIG. 9 is a block diagram for illustrating one embodiment of a communication interface of the present invention.

Referring to FIG. 9, a preferred embodiment of the communication interface that can be used in either the FIG. 7 or the FIG. 8 embodiment particularly includes a microprocessor and memory. The memory is programmed such that the microprocessor operates in accordance with the present invention. If the communication interface is to have the transmit capability of the present invention, the memory is programmed to enable the microprocessor to retrieve electronic genetic profile data stored in the memory and to transmit electric signals to the power line interface causing the power line interface to communicate the appropriate electronic genetic profile data over the connected power line wires in the transmission format of the present invention. If the communication interface is to have the receive capability of the present invention, the memory is programmed to enable the microprocessor to receive electrical signals through the power line interface from the power line wires. The memory for a receive capability is also programmed with the library 16 so that received signals can be checked for recognition and responsive action taken when recognition occurs. This preferably defines means for executing a respective program file from the library in response to the communication interface receiving an electrical signal representing the universal identification code corresponding to the respective program file. Non-limiting specific transmitter and receiver programming examples are given below.

The microprocessor and memory of the communication interface can also be described as comprising a programmed front end 26 and a programmable back end 28. The programmed front end 26 is pre-programmed to communicate electrical signals to the power line interface portion of the section 24 in the FIG. 7 embodiment and/or to receive signals received through the power line interface, both as stated above.

The back end 28 is connected to the front end circuit and is adapted to be programmed with the universal identification code for the specific electric device. That is, the programmable back end 28 enables a manufacturer, for example, to program the specific communication interface uniquely for the specific electric device. This back end 28 can be readily implemented merely by the capability of the microprocessor of the communication interface to receive external inputs and to store such inputs (or selected portions thereof) in the memory.

Thus, the programmable back end 28 provides means for defining in an article of manufacture (e.g., the electric device) a unique identification code. The programmed front end 26 provides means for electrically propagating from, or receiving into, the article a plurality of data signals collectively representing the unique identification code. For the particular protocol of the present invention defined above, each of these data signals has a plurality of data bits transmitted in the form of an X-10 house code and an X-10 unit code except the unit code does not include a fifth bit. Furthermore, the overall plurality of data bits defining a unique universal identification code includes a plurality of segments wherein each segment has such a house code and such a unit code.

A non-limiting example of the aforementioned front end and back end features will become apparent with the further explanation below regarding FIG. 11.

The power line interface portion of the section 24 in the FIG. 7 embodiment provides a circuit to communicate over the power line installation. Such circuit includes at least means for transmitting electrical signals from the circuit onto the power line wires. Such a power line interface is a commercially available device. Two particular models are TW523 and PL513 from X-10 USA of Closter, N.J. These devices operate to transmit the bits onto the power line installation at zero crossings of the power signal in a suitable manner such as consistent with the aforementioned X-10 protocol and extensions thereof. This also includes the format of the transmission which can be in the true and complemental format and at the frequency described in the pertinent patents incorporated herein by reference. Such an interface circuit includes both transmitter means for transmitting electrical signals from the circuit onto the power line installation and receiver means for receiving electrical signals into the circuit from the power line installation.

In FIG. 8, the power line interface (PLI) 24a is separate from the communication interface 24b contained within the device of this illustration. This power line interface can be the same as mentioned above but may be installed and retained at a particular electrical outlet location. In this use, the power line interface 24a can be programmed to identify the specific location of the outlet, for example. This information can be transferred to, for example, the communication interface of a specific electric device of the present invention connected to the power line interface such that the specific device is then programmed to operate only at that location. Thus, this is other information that can be loaded into the programmable back end 28 (FIG. 9) of the embodiment of the communication interface 24b shown in FIG. 8.

Such an electrical outlet as mentioned above is illustrated in FIG. 8 and marked by the reference numeral 30. The outlet 30 is located on a wall 32. The PLI unit 24a is plugged into the outlet 30 and a conventional cord 34 from the electric device is connected into the PLI unit. The cord 34 defines means for connecting the apparatus, the front end circuit and the back end circuit to a power line. The cord 34 can be plugged into a different outlet of the power installation if desired. A communication line 36 is connected from the communication interface 24b to the PLI unit 24a.

Figure 10:
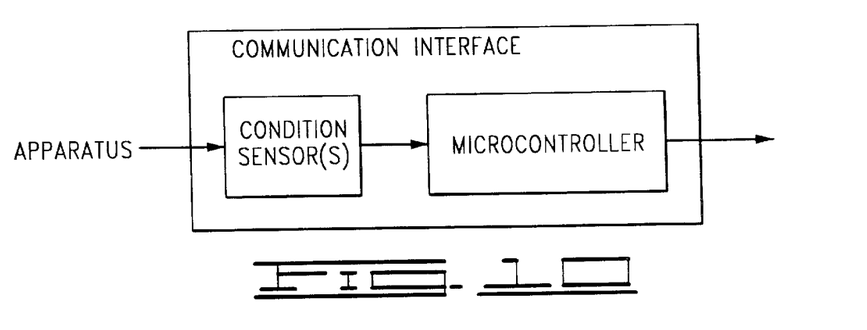
FIG. 10 is a block diagram for illustrating another embodiment of a communication interface of the present invention.

Referring to FIG. 10, the communication interface can also include sensing means such as to sense one or more conditions. In the preferred embodiment, this is a means for sensing a condition of the functional apparatus with which the communication interface is associated and for generating a respective control signal in response to a sensed condition. The communication interface of FIG. 10 includes what is shown in FIG. 9 but labeled simply as a "microcontroller." This communication interface can be used in the embodiments of FIGS. 7 and 8, for example, with the electrically energizable apparatus that performs the intended function of the electric device and with the means for connecting the apparatus to an alternating current power line installation (e.g., the PLI). The means for sensing includes one or more condition sensors. A specific example is illustrated in FIG. 11.

FIG. 11 illustrates a monitoring device for an electric lamp that connects to an alternating current power line. This monitoring device is in accordance with the above-described explanation of the present invention. The monitoring device of FIG. 11 specifically includes a current sensing circuit 38 to sense electric current relative to operation of the electric lamp; a comparison circuit 40 connected to the current sensing circuit to compare a sensed current measurement to a predetermined reference magnitude; and a microcontroller 42 connected to the current comparison circuit and programmed to output for transmission over the power line respective codes corresponding to respective outputs from the current comparison circuit. This is used in conjunction with an electric lamp system including a ballast 44, an electric lamp 46, and an electric lamp 48 connected together and energized over an alternating current power line installation such as the installation 2 of FIG. 1.

The current sensing circuit 38 senses current in the line energizing either or both of the lamps 46, 48. The circuit 38 includes a current sensing transformer 50 that produces current flow proportional to the current drawn by the lamps 46, 48. This proportional current is rectified by a diode 52 and produces a proportional voltage at the junction of a resistor 54 and a resistor 56.

The comparison circuit 40 includes a first comparator connected to the current sensing circuit 38 to compare the proportional voltage to a reference voltage defined at the junction of resistors R1 and R2. This comparator has inputs labeled IN2– and IN2+ and an output labeled OUT2. If the voltage at IN2– which is proportional to the current drawn by the lamps 46, 48 is less than the reference voltage at IN2+, OUT2 is a logic high ("1") which provides a signal to the microcontroller 42 indicating one of the two lamps is out.

The comparison circuit 40 also includes a second comparator connected to the current sensing circuit 38 to compare the proportional voltage to another reference voltage, this one defined at the junction of resistors R3 and R4. In the illustrated embodiment, this second comparator has inputs labeled IN1– and IN1+ and an output labeled OUT1. If IN1– is less than IN1+, OUT1 is a logic high ("1") which indicates to the microcontroller that both lamps are out. This is so because in the illustrated implementation the voltage at the R3, R4 junction is less than the reference at the R1, R2 junction, thereby representing a lower current flow which indicates neither lamp is conducting sufficient current to be illuminated. When OUT1 is high, OUT2 will also still be high since the proportional voltage at the inputs is necessarily lower than the R1, R2 reference that is greater than the R3, R4 reference. If both OUT1 and OUT2 are logic low ("0"), normal operation of both lamps is indicated.

The microcontroller 42 is powered by a conventional dc power supply 58 which converts the alternating current from the power line installation 2 to suitable direct current voltage levels for the microcontroller 42. The illustrated microcontroller 42 is implemented in a conventional chip, such as the one referenced in FIG. 11, but programmed to perform in accordance with the present invention. Programming can occur, for example, using a personal computer connected to the microcontroller 42 through connector 59 shown in FIG. 11. The particular chip shown in FIG. 11 implementing the microcontroller 42 is connected to the power line interface through a connector 60 and is constructed with a twelve-bit algorithm core architecture. The microcontroller 42 communicates segments of logic zeros and ones in a binary sequence which allows the power line interface to transmit codes using at least part of the X-10 protocol as explained above.

In response to receiving either one of the signals from OUT2 or OUT1 indicating one or both lights is out, the microcontroller outputs a code through the P1 pin (as labeled in FIG. 11) at the appropriate times. This timing occurs when the power line interface detects a zero crossing of the power signal and notifies the microcontroller 42 through the pin P0 in FIG. 11. P0 input correlates to "zpin" and P1 output correlates to "mpin" in the program listed below for the microcontroller 42.

The implementation of FIG. 11 is also constructed to receive data. Reception of data from the PLI to which the plug 60 connects occurs through pin P2 of the microcontroller 42 shown in FIG. 11.

The PLI plug 60 shown in FIG. 11 plugs into an external power line interface such as PLI 24a illustrated in FIG. 8. The plug 60 and its connecting wires are one implementation of the communication line 36 of FIG. 8.

FIG. 11 also shows a wire going to a pin P11 of the microcontroller 42. This connection is not used in the actual implementation of FIG. 11; however, the connection is shown to indicate that this pin can receive a control voltage that can be used to instruct the microcontroller. For example, in the intelligent ballast circuit of FIG. 11, this line might be held low, for example, to indicate normal operation of the lamps or a high voltage might be applied to indicate that one of the lamps is intentionally turned off so that the microcontroller does not misread OUT2 of the first comparator as indicating a lamp is malfunctioning.

In accordance with the foregoing, the microcontroller 42 is connected to the two comparators of the comparison circuit 40 and programmed to output for transmission over the power line respective codes corresponding to respective outputs from the two comparators. A first code is output in response to the comparators indicating both lamps are conducting operating current (i.e., both OUT2 (P9 of the microcontroller chip) and OUT1 (P10 of the microcontroller) are low in the FIG. 11 implementation). A second code is output in response to the comparators indicating one of the two lamps is conducting operating current and the other of the two lamps is not conducting operating current (i.e., OUT2/P9 is high and OUT1/P10 is low). A third code is output in response to the comparators indicating neither of the two lamps is conducting operating current (i.e., both OUT2/P9 and OUT1/P10 are high). The microcontroller is also programmed to output for transmission over the power line a fourth code identifying the ballast with which the monitoring device is used. This fourth code is the unique universal identification code referred to above.

Thus, the circuit of FIG. 11 senses alternating current flow related to the condition of the electric device implemented in the particular example by the ballast and two lamps. Respective codes are transmitted over the power line installation through operation of the microcontroller and the power line interface to which it is connected, which power line interface is in turn connected to the power line installation such as illustrated in FIGS. 1 and 8. Such power line installation also includes another device, such as a computer, which receives the code and in response executes in the computer one or more program files.

The following is a program listing showing a specific implementation of programming for the microcontroller 42 of FIG. 11:

```
mpin     con    0     'identifies zero crossing modulation
zpin     con    1     'tells the zero detect to fire
houseL   con    11    'constant binary eleven code
houseA   con    0     'not needed
unit1    con    0     'identifies constant zero code
unit2    con    1     'identifies constant one code
unit3    con    2     'identifies constant two code
unit4    con    3     'identifies constant three code
unit5    con    4     'identifies constant four code
start:
    if in11 = 0 then ident    'event macro condition
    if in11 = 1 then ident    'event macro condition
loop:
    if in11 = 1 then ident                  'event macro condition
    if in9 = 1 and in10 = 0 then ilamp      'event macro condition
    if in10 = 1 and in9 = 1 then both
    goto loop                   'tells the condition to stay in loop
ident:
    debug "Magnetek Balast B2321120RH",cr   'serout to computer/return
    debug "Running diagnostics",cr          'serout to computer/return
    debug "Please Wait a moment",cr         'serout to computer/return
    pause 5000
    xout mpin,zpin,[houseL\unit3]
    xout mpin,zpin,[houseL\unit3]
    xout mpin,zpin,[houseL\unit3]           'combination electronic genetic Code
    xout mpin,zpin,[houseL\unit3]
    xout mpin,zpin,[houseL\unit3]
    pause 5000                              'Wait five seconds
    debug cls                               'clear screen
    goto htnew                              'read last condition before
ilamp:                                      'returning to loop
    xout mpin,zpin,[houseL\unit1]
    xout mpin,zpin,[houseL\unit2]
```

```
    xout mpin,zpin,[houseL\unit2]      'combination electronic genetic code
    xout mpin,zpin,[houseL\unit1]
    xout mpin,zpin,[houseL\unit1]
    debug "One lamp is Out!",cr
    pause 5000                          'wait five seconds
    debug cls                           'clear screen
    goto htnew                          'read last condition before
both:                                   'returning to loop
    xout mpin,zpin,[houseL\unit2]
    xout mpin,zpin,[houseL\unit2]
    xout mpin,zpin,[houseL\unit1]      'combination electronic genetic code
    xout mpin,zpin,[houseL\unit1]
    xout mpin,zpin,[houseL\unit1]
    debug "All lamps are out",cr        'serout condition statement
    debug "Please check them!",cr       ' and return to next line
    pause 5000                          'wait five seconds
    debug cls                           'clear screen
    goto htnew                          'read last condition before
htnew:                                  'returning to loop
    pause 1500                          'hold signal 1.5 seconds
    if in10 = 0 and in9 = 0 then OK     'if true then go to OK
    goto loop                           'if false go to loop
OK:
    xout mpin,zpin,[houseL\unit4]
    xout mpin,zpin,[houseL\unit4]
    xout mpin,zpin,[houseL\unit4]      'Combination electronic genetic code
    xout mpin,zpin,[houseL\unit4]
    xout mpin,zpin,[houseL\unit4]
    pause 5000                          'wait five seconds
    xout mpin,zpin,[houseL\unit2]
    xout mpin,zpin,[houseL\unit1]
    xout mpin,zpin,[houseL\unit1]      'combination electronic genetic code
    xout mpin,zpin,[houseL\unit1]
    xout mpin,zpin,[houseL\unit2]
    debug "Passed All Test!",cr         'serout statement
    pause 5000                          'wait five seconds
    debug cls                           'Clear screen
    goto loop                           'go to loop
                                        'End!
```

Because the input to P11 of the microcontroller 42 is not used in the example of FIG. 11 as mentioned above, the "transmitter" program listed above starts by running in the microcontroller 42 subroutine "ident" regardless of the state of P11 ("in11" in the program code). In "ident" the microcontroller 42 outputs a five-segment universal identification code having the house/unit combinations L3, L3, L3, L3, L3. Running "ident" (or analogous routine, program, etc.) and outputting the respective universal identification code is preferably performed at least once for each device, such as when it is connected to the power line installation, so that one or more other devices on the system become aware of the new device's presence.

This bit sequence (and others described below) is output bit-by-bit through P1 of microcontroller 42, in synchronization with the zero-detect signal received through P0, in the overall format illustrated in FIG. 4 but as actually put onto the power line installation 2 through operation of the PLI 24a (for a FIG. 8 type configuration, for example).

At the end of "ident" the microcontroller 42 runs subroutine "htnew." Under "htnew" the microcontroller checks its pins P9 and P10 ("in9" and "in10" in the program code) and if both are logic low it goes to "OK." If that is not the case (i.e., "in9" and "in10" are not both low), then "loop" is run.

In "OK" the microcontroller transmits two separate codes in this implementation. One is the five-segment code having house-unit combinations L4, L4, L4, L4, L4, . The other transmitted code has the five-segment house-unit combinations L2, L1, L1, L1, L2. The former is used to indicate that all diagnostics have been run, and the latter is used to indicate all tests have been passed (in this case, both lamps are working properly). After these codes are sent, the microcontroller goes to "loop."

In "loop" the microcontroller continues to monitor the status of its pins P9 and P10 until one of the two events designated above in "loop" occurs. If P9 (in9) goes high and P10 (in10) stays low, the microcontroller goes to "ilamp." If both P9 and P10 go high, the microcontroller goes to "both." In "ilamp" the microcontroller sends the five-segment code having house-unit combinations L1, L2, L2, L1, L1. In "both" the microcontroller transmits the five-segment code having house-unit combinations L2, L2, L1, L1, L1. At the end of "ilamp" and "both" the microcontroller goes to "htnew."

The following is a program listing for a computer (implementing a receiving device connected to the power line installation 2 in this example) that responds to transmissions resulting from the circuit of FIG. 11 programmed in accordance with the above program:

```
001.
002.    Event: Identification diagnostics
003.    If:
004.    (X:seq) L3,L3,L3,L3,L3, rec in 3 sec      'diagnostic combination code
OO5.    Then:
006.    ACSII out com 1:&&C:\Ballast\File1.exe    'graphic file to diagnostics condition
007.    Event: One lamp Out!
008.    If:
009.    (X:seq) L1,L2,L2,L1,L1, rec in 3 sec      'one lamp out combination code
010.    Then:
011.    ASCII out com 1:&&C:\Ballast\File2.exe    'graphic file to one lamp out condition
012.
013.    Event: Both Lamps Out!
014.    If:
015.    (X:seq) L2,L2,L1,L1,L1, rec in 3 sec      'two lamp out combination code
016.    Then:
017.    ASCII out com 1:&&C:\Ballast\File3.exe    'graphic file to two lamp out condition
018.
019.    Event: Diagnostics complete
020.    If:
021.    (X:seq) L4,L4,L4,L4,L4, rec in 3 sec      'diagnostic complete code
022.    Then:
023.    ASCII out com 1:&&C:\Ballast\File4.exe    'graphic file to diagnostic condition
024.
025.    Event: Normal Operation Condition
026.    If:
027.    (X:seq) L2,L1,L1,L1,L2, rec in 3 sec      'Normal operation code
028.    Then:
029.    ASCII out com 1:&&C:\Ballast\File5.exe    'Graphic file to normal operation condition
030.
031.    END!
```

A non-limiting example of a suitable computer for implementing and running this program includes an IBM-compatible 386 or above. The computer having the listed program is thereby programmed both with the requisite recognition data and the contents to use in response. The recognition data includes the listed five-segment codes that can be transmitted by the transmitter device of FIG. 11: L3, L3, L3, L3, L3; L1, L2, L2, L1, L1; L2, L2, L1, L1, L1; L4, L4, L4, L4, L4; and L2, L1, L1, L1, L2. The corresponding "contents" are the actions to be taken when one of these codes is recognized (see program lines 006, 011, 017, 023, and 029). Each of these in this case includes sending an ASCII command through the computer's communication port and running a respective executable file (e.g., C:\Ballast\File1.exe). Here the file is a graphical user interface file that pertains to the respective action of the transmitting device (e.g., the diagnostics condition). Accordingly, the computer recognizes L3, L3, L3, L3, L3 as the unique universal identification code for the device of FIG. 11. It recognizes L1, L2, L2, L1, L1 as the code designating one lamp is out and L2, L2, L1, L1, L1 as the code designating both lamps are out. The computer recognizes L4, L4, L4, L4, L4 as designating the internal diagnostics of the device of FIG. 11 have been run and L2, L1, L1, L1, L2 as designating the diagnostics have been successfully passed whereby the device is operating normally.

The foregoing simple example has shown one-way communication from a transmitting device (FIG. 11) to a receiving device (a computer); however, each of these can be provided with the other capability as well to enable two-way communication. Such implementations, and others of the present invention, are apparent from the foregoing explanation of the present invention.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A monitoring device for an electric lamp system including a ballast, a first electric lamp, and a second electric lamp connected together and energized over an alternating current power line installation, the monitoring device comprising:

a current sensing circuit to sense electric current at a power input of the ballast;

a first comparator connected to the current sensing circuit to compare the sensed current to a first reference;

a second comparator connected to the current sensing circuit to compare the sensed current to a second reference; and a microcontroller connected to the first and second comparators and programmed to output for transmission over the power line respective codes corresponding to respective outputs from the first and second comparators, wherein the respective codes include a first code output in response to the first and second comparators indicating the first and second lamps are conducting operating current, a second code output in response to the first and second comparators indicating one of the first and second lamps is conducting operating current and the other of the first and second lamps is not conducting operating current, and a third code output in response to the first and second comparators indicating neither of the first and second lamps is conducting operating current.

2. The monitoring device as defined in claim 1, wherein the microcontroller is embodied in an integrated circuit constructed with a twelve-bit algorithm core architecture.

3. The monitoring device as defined in claim 1, wherein the microcontroller is further programmed to output for transmission over the power line a fourth code identifying the ballast with which the monitoring device is used.

4. The monitoring device as defined in claim 3, wherein the microcontroller is embodied in an integrated circuit constructed to transmit the four codes using at least part of X-10 protocol.

* * * * *

UNITED STATES PATENT AND TRADEMARK OFFICE
CERTIFICATE OF CORRECTION

PATENT NO. : 6,281,784 B1
DATED : August 28, 2001
INVENTOR(S) : Robert E. Redgate, Anthony R. Carson, Michael T. Carson, Kiet Q. Lam, Dustin P. Ketron and Donald L. Toland It is certified that error appears in the above-identified patent and that said Letters Patent is hereby corrected as shown below:

Title page,
OTHER PUBLICATIONS, line 4, delete "System" and insert -- Systems -- therefor.

Column 21,
Line 5 of table, delete "OO5." and insert -- 005. -- therefor.

Signed and Sealed this

Sixteenth Day of April, 2002

Attest:

JAMES E. ROGAN
Attesting Officer
Director of the United States Patent and Trademark Office